United States Patent
Wang et al.

(10) Patent No.: US 11,614,853 B1
(45) Date of Patent: Mar. 28, 2023

(54) METHOD FOR DESKTOP WIDGETS TO PLAY VIDEO CONTENT AUTOMATICALLY

(71) Applicant: Livehouse Technologies Limited, Hongkong (CN)

(72) Inventors: Wei Wang, Guangzhou (CN); Wenjie Yang, Wuhan (CN)

(73) Assignee: Livehouse Technologies Limited, Hongkong (CN)

( * ) Notice: Subject to any disclaimer, the term of this patent is extended or adjusted under 35 U.S.C. 154(b) by 0 days.

(21) Appl. No.: 17/750,457

(22) Filed: May 23, 2022

(51) Int. Cl.
    *G06F 3/0484* (2022.01)
(52) U.S. Cl.
    CPC .................................. *G06F 3/0484* (2013.01)
(58) Field of Classification Search
    CPC ........ G06F 3/048; G06F 3/0484–0486; G06Q 50/01
    See application file for complete search history.

(56) References Cited

U.S. PATENT DOCUMENTS

| | | | |
|---|---|---|---|
| 11,308,176 B1* | 4/2022 | Underwood | .......... G06F 3/0488 |
| 2016/0246488 A1* | 8/2016 | Sassouni | ............. G06F 3/04845 |
| 2017/0031591 A1* | 2/2017 | Lee | ..................... G06F 3/04883 |
| 2018/0365270 A1* | 12/2018 | Azout | ..................... G06F 3/013 |
| 2019/0138165 A1* | 5/2019 | Siddhantam | .......... G06F 3/0482 |
| 2020/0356593 A1* | 11/2020 | Azzinnari | ........... G06F 3/04855 |

OTHER PUBLICATIONS

KTLA5. Locket App. Feb. 15, 2022. https://www.youtube.com/watch?v=o-XIA0386bo (Year: 2022).*
Bhavsar, Rushabh. Getting Started with "Widget Extension". Oct. 1, 2020. https://medium.com/mindful-engineering/introducing-ios-14-widget-extension-1abaa198d183 (Year: 2020).*

* cited by examiner

*Primary Examiner* — Liang Y Li
(74) *Attorney, Agent, or Firm* — Georgi Korobanov

(57) ABSTRACT

Application A method for allowing desktop widgets to automatically play video content realizes the form of allowing desktop widgets to support video playback. The method includes the following steps: S1 acquiring shooting resources through a camera of a mobile device, and sending the shooting resources to a desktop widget of a friend's mobile phone with one click. The method application realizes the form of allowing desktop widgets to support video playback, realizes interoperability and sharing between Android and iOS systems. This effectively solves the problem of non-immediate notification of important matters, allowing users to see important information on the desktop as soon as they turn on the phone. It also adds the function of displaying the shooting resources in a loop. The desktop does not freeze when playing multiple videos at the same time, and meets the needs of reminders and sharing in different scenarios in the form of videos.

8 Claims, 1 Drawing Sheet

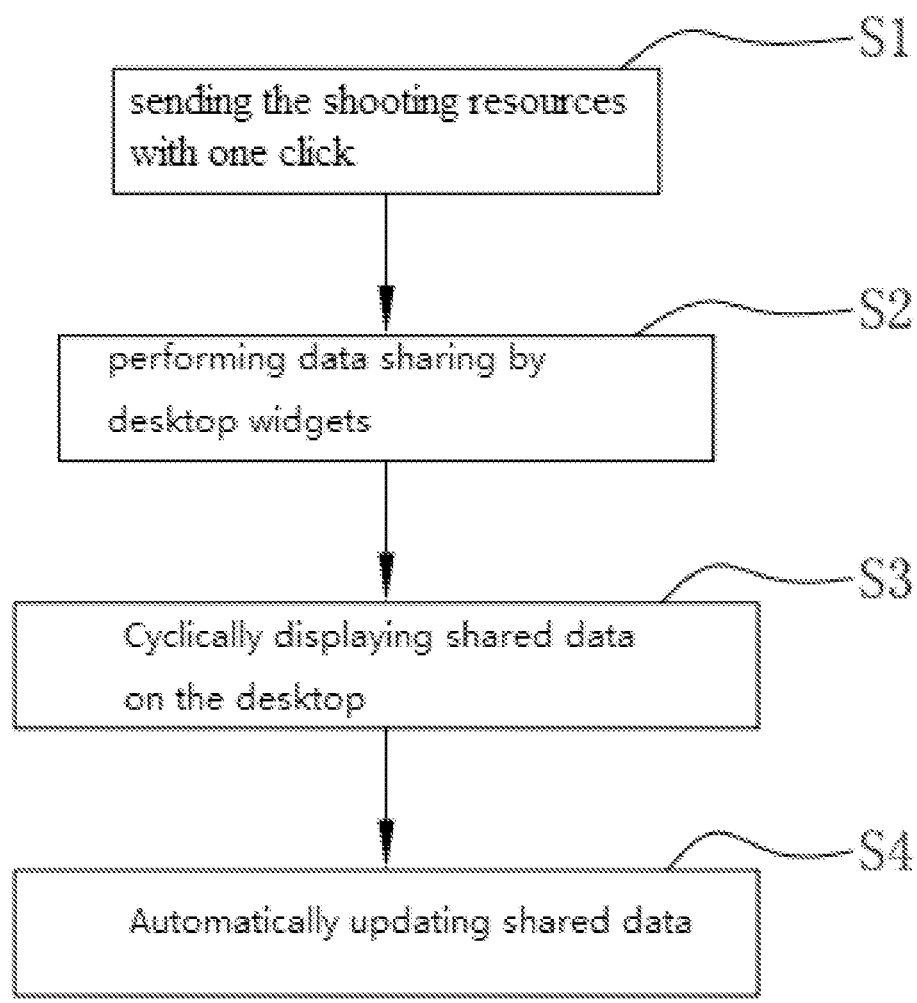

METHOD FOR DESKTOP WIDGETS TO PLAY VIDEO CONTENT AUTOMATICALLY

TECHNICAL FIELD

The present application relates to the technical field of system desktop widgets, in particular to a method for allowing desktop widget automatically play video content.

BACKGROUND

With the continuous development and progress of technology, the demand for the use of mobile devices continues to increase. In the process of using mobile devices, screen widgets are one of the important functions in the mobile phone system. The new entrance of the APP given by the screen component enriches the level of interaction, has more various operation modes, and spawned countless creative gameplays.

Widgets usually come in three different sizes: small, medium, and large. In different operating systems, users can find the widgets they need to use in the widget library, and select the appropriate size. After selecting the widget, the user can enter the interface editing mode. In this mode, the user can move the widget to the desired position, and can make further settings and adjustments as needed.

The existing technology is only used for very basic widgets, and the most display methods are only clocks, calendars, weather, etc. Although this component is simple, in fact, the way of conveying information is too fixed and single, and the playability is not strong, Which leads to a significant reduction in the utilization rate of desktop widgets. At the same time, this also greatly limits the information receiving capacity of the user opening the desktop at the first time.

Therefore, it is necessary to provide a method for the desktop widget to automatically play video content to solve the above technical problems.

SUMMARY

The present application provides a method for allowing desktop widget automatically play video content, which solves the problem that the way of conveying information is too fixed and single.

In order to solve the above-mentioned technical problems, the method for allowing desktop widget automatically play video content provided by the present application includes the following steps:

S1 acquiring shooting resources through a camera of a mobile device, and sending the shooting resources to a desktop widget of a friend's mobile phone with one click;

S2 sharing data by the desktop widget through a server;

S3 automatically displaying the data after shared on the desktop widget, and playing the shared data in a loop after the display;

S4 regularly updating the shared data by the desktop widget through the server.

Preferably, the shooting resources in the step S1 include photo resources and video resources, and after shooting, the desktop widget provides one-click sending function.

Preferably, the desktop widget registers the widget extension type with the iOS system by means of software development, wherein there are two types of extension types, namely single image and multiple images, to provide users with a choice of display modes, wherein the implementation method of iOS is to cut the video into multiple images and play it in a loop, and the implementation method of Android is to click the play icon, so that the video can be played on the desktop widget.

Preferably, each of the type is divided into two sizes, a small size and a large size, to provide users with a choice of screen size.

Preferably, the photos shared in the step S3 are directly displayed when displayed.

Preferably, when the method is the implementation method of iOS, when the video shared in the step S3 is displayed, the video is averagely extracted 5 frame by time, switching 1 frame every 1 second, thus performing an infinite loop display;

when the method is the implementation method of Android, click the play icon to play the video in the step S3.

Preferably, in the single-image display mode, the desktop widget only displays the latest shooting resource of a friend.

Preferably, in the u image display mode, 3-6 friends' shooting resources are displayed.

Preferably, when updating regularly in step S4, the widget is set to request the server again every 20 minutes to refresh the shooting resources for display.

Preferably, in the process of the regular update, after the friend's desktop widget publishes new shooting resources, the server prompts the user by means of message push, and at this time, after the desktop widget receives the message push, the desktop widget will be refreshed once, and display the latest shooting resources.

Compared with the related art, the method for allowing desktop widget automatically play video content provided by the present application has the following beneficial effects:

The present application provides a method for allowing desktop widget automatically play video content, which facilitates sharing for mobile devices through the desktop widget, and effectively solves the problem that important matters are not notified immediately, allowing users to see important information on the desktop as soon as they turn on the phone. At same time, it also adds the function of displaying the shooting resources in a loop, which greatly increases the function of the widget and give new vitality to the desktop widgets. The desktop does not freeze when playing multiple videos at the same time, and meets the needs of reminders and sharing in different scenarios in the form of videos, Which improves the efficiency of information transmission.

BRIEF DESCRIPTION OF DRAWINGS

FIG. 1 is a schematic flowchart of a method for allowing desktop widget automatically plays video content provided by the present application.

DETAILED DESCRIPTION

The present application will be further described below in conjunction with the embodiments.

the method for allowing desktop widget automatically play video content provided by the present application includes the following steps:

S1 acquiring shooting resources through a camera of a mobile device, and sending the shooting resources to a desktop widget of a friend's mobile phone with one click;

S2 sharing data by the desktop widget through a server;

S3 automatically displaying the data after shared on the desktop widget, and playing the shared data in a loop after the display;

S4 regularly updating the shared data by the desktop widget through the server.

The desktop widget which facilitates sharing for mobile devices t, and effectively solves the problem that important matters are not notified immediately, allowing users to see important information on the desktop as soon as they turn on the phone. At same time, it also adds the function of displaying the shooting resources in a loop, which greatly increases the function of the widget and give new vitality to the desktop widgets. The desktop does not freeze when playing multiple videos at the same time, and meets the needs of reminders and sharing in different scenarios in the firm of videos, which improves the efficiency of information transmission.

The desktop widget has the ability to instantly shoot and send:

The mobile device is provided with the function of sending shooting to the desktop widget with one click. This function simplifies the sharing of shooting resources, effectively solves the problem of instant notification of important matters, and allows users to see important information on the desktop as soon as they turn on the phone.

The desktop widget has the function of video loop display:

The existing desktop widgets only maintain the form of pictures, which can convey far less information than videos. Therefore, the desktop widget of the present application can selectively display videos in different sizes, and can ensure that the video is played in a loop and the desktop widget does not freeze the frame when playing the video, which not only greatly increases the function of the component, but also gives new vitality to the desktop widgets.

The desktop widget has the ability to play different videos at the same time using multiple widgets:

The desktop widget can play multiple videos on the desktop of the mobile device at the same time without being stuck, meet the needs of reminders and sharing in different scenarios in the form of videos, and improve the efficiency of information transmission.

The shooting resources in the step S1 include photo resources and video resources, and after shooting, the desktop widget provides one-click sending function.

This function facilitates sharing, and effectively solves the problem that important matters are not notified immediately, allowing users to see important information on the desktop as soon as they turn on the phone.

The desktop widget registers the widget extension type with the iOS system by means of software development, wherein there are two types of extension types, namely single image and multiple images, to provide users with a choice of display modes, wherein the implementation method of iOS is to cut the video into multiple images and play it in a loop, and the implementation method of Android is to click the play icon, so that the video can be played on the desktop widget.

Each of the type is divided into two sizes, a small size and a large size, to provide users with a choice of screen size.

The photos shared in the step S3 are directly displayed when displayed.

When the method is the implementation method of iOS, when the video shared in the step S3 is displayed, the video is averagely extracted by time 5 frame, switching 1 frame every 1 second, thus performing an infinite loop display;

when the method is the implementation method of Android, click the play icon to play the video in the step S3.

This is the iOS implementation method, and Android can play the video directly.

By selecting the screen size, pictures or videos in different sizes can be displayed, and the loop playback of the video can be ensured and the effect of the desktop widget to play the video without the frame being stuck;

It greatly increases the function of the widget and give new vitality to the desktop widgets.

In the single-image display mode, the desktop widget only displays the latest shooting resource of a friend.

In the multi-image display mode, 3-6 friends' shooting resources are displayed.

The multi-image display mode enables widgets to play multiple images or videos on the desktop at the same time without being stuck, meeting the needs of reminders and sharing in different scenarios in the form of videos, and improving the efficiency of information transmission.

When updating regularly in step S4, the widget is set to request the server again every 20 minutes to refresh the shooting resources for display.

Take 6 shooting resources as an example when displayed on the desktop:

When a friend publishes more than six shooting resources, the desktop only displays the latest six shooting resources, and will not be superimposed and accumulated, reducing the capacity occupied by the desktop;

When updating regularly, select the latest 6 shooting resources, and the expired shooting resources will not continue to be displayed on the desktop. Overdue and unchecked shooting resources are accumulated in a counting manner, and the counted number is displayed on the desktop to provide users with support for viewing and understanding.

In the process of the regular update, after a friend's desktop widget publishes new shooting resources, the server will prompt the user by means of message push, and at this time, after the desktop widget receives the message push, the desktop widget will be refreshed once, and display the latest shooting resources.

The regular update will set the widget to request the server to refresh the data display every 20 minutes, so as to display the latest data in real time and achieve the effect of updating the desktop widget in real time.

The desktop widgets in the prior art mainly support only pictures, with single functions and simple information. To solve this problem, it is improved to support video playback, which is an improvement of information flow. As a video technical solution, there are many choices. The best limitation is that the video supports 1 to 5 seconds. Compared with the dynamic picture, the smoothness of the video and the completeness of the number of frames are much better.

Realize the form of allowing desktop widgets to support video playback, realize interoperability and sharing between Android and iOS systems, both can be displayed, and realize desktop widgets for video playback.

The working principle of the method for allowing desktop widget automatically play video content provided by the present application is as follows:

Before use, the mobile device is connected to the Internet;

When the user selects the desktop widget and adds it to the desktop of the mobile device, the desktop widget immediately requests the server to load the latest batch of photos or videos published by the current user's friends, and display them on the server of the desktop widget;

The displaying way of pictures is direct display;

The displaying way of videos is to extract 5 frames of the video on average by time, and switch 1 frame every 1 second, thus performing an infinite loop display.

The single-image widget only displays the latest photo and video of a friend;

The multi-image widget will display 3~6 friends' photos and videos;

After the photo and video display is completed, the widget will be set to request the server again every 20 minutes to refresh the data display. In addition, when a friend publishes a new photo or video, the server will prompt the user through a message push. At this time, after the desktop widget receives the message push, it will immediately refresh the display data of the desktop widget to display the latest photos or videos, so as to achieve the effect of updating the desktop widget in real time.

Compared with the related art, the method for allowing desktop widget automatically play video content provided by the present application has the following beneficial effects:

The desktop widget facilitates sharing for mobile devices through the desktop widget, and effectively solves the problem that important matters are not notified immediately, allowing users to see important info nation on the desktop as soon as they turn on the phone. At same time, it also adds the function of displaying the shooting resources in a loop, which greatly increases the function of the widget and give new vitality to the desktop widgets. The desktop does not freeze when playing multiple videos at the same time, and meets the needs of reminders and sharing in different scenarios in the form of videos, which improves the efficiency of information transmission.

The above descriptions are only the embodiments of the present application, and are not intended to limit the scope of the present application. Any equivalent structure or equivalent process transformation made by using the contents of the description of the present application, or directly or indirectly applied in other related technical fields, are similarly included in the scope of patent protection of the present application.

What is claimed is:

1. A method for allowing desktop widgets to automatically play video content, the method comprising:

a step S1 of acquiring shooting resources through a camera of a mobile device and sending the shooting resources to a desktop widget of a friend's mobile phone with one click;

a step S2 of sharing data by the desktop widgets through a server, wherein the desktop widgets are implemented in IOS and ANDROID operating systems, wherein an implementation method in IOS comprises a desktop widget in the IOS operating system registering the widget extension type with the IOS operating system by means of software development, wherein there are two extension types comprising a single image extension type and a multiple image extension type to provide users with a choice of display modes, wherein the implementation method in IOS further comprises cutting the video into multiple images and playing the multiple images in a loop, and wherein an implementation method in ANDROID comprises clicking a play icon so that the video can be played on a desktop widget in the ANDROID operating system;

a step S3 of automatically displaying the data on a desktop widget after the sharing of the data and playing the shared data in a loop after the displaying, wherein the implementation method in IOS further comprises when the video shared in the step S3 is displayed 5 frames of the video are extracted on average by time, switching 1 frame every 1 second and performing an infinite loop display; when the implementation method in ANDROID further comprises clicking the play icon to play the video in the step S3;

a step S4 of regularly updating the shared data by the desktop widgets through the server.

2. The method for allowing desktop widgets to automatically play video content according to claim 1, wherein the shooting resources in step S1 include photo resources and video resources, and after shooting, the desktop widgets provides a one-click sending function.

3. The method for allowing desktop widgets to automatically play video content according to claim 2, wherein each extension type is divided into two sizes, a small size and a large size, to provide users with a choice of screen size.

4. The method for allowing desktop widgets to automatically play video content according to claim 3, wherein the photos shared in step S3 are directly displayed when displayed.

5. The method for allowing desktop widgets to automatically play video content according to claim 4, wherein in the single-image display mode, the desktop widgets only displays the latest shooting resource of a friend.

6. The method for allowing desktop widgets to automatically play video content according to claim 5, wherein in the multi-image display mode, 3-6 friends' shooting resources are displayed.

7. The method for allowing desktop widgets to automatically play video content according to claim 6, wherein, when updating regularly in step S4, the desktop widgets are set to request the server every 20 minutes to refresh the shooting resources for display.

8. The method for allowing desktop widgets automatically play video content according to claim 7, wherein updating regularly in step S4 further comprises, after a friend's desktop widget publishes new shooting resources, the server prompts a user by means of message push, wherein after a desktop widget receives the message push, the desktop widget receiving the message push is refreshed once and displays the latest shooting resources.

* * * * *